W. H. HAYES.
INTERNAL COMBUSTION ENGINE.
APPLICATION FILED JAN. 27, 1919.
1,345,927.
Patented July 6, 1920.
2 SHEETS—SHEET 1.
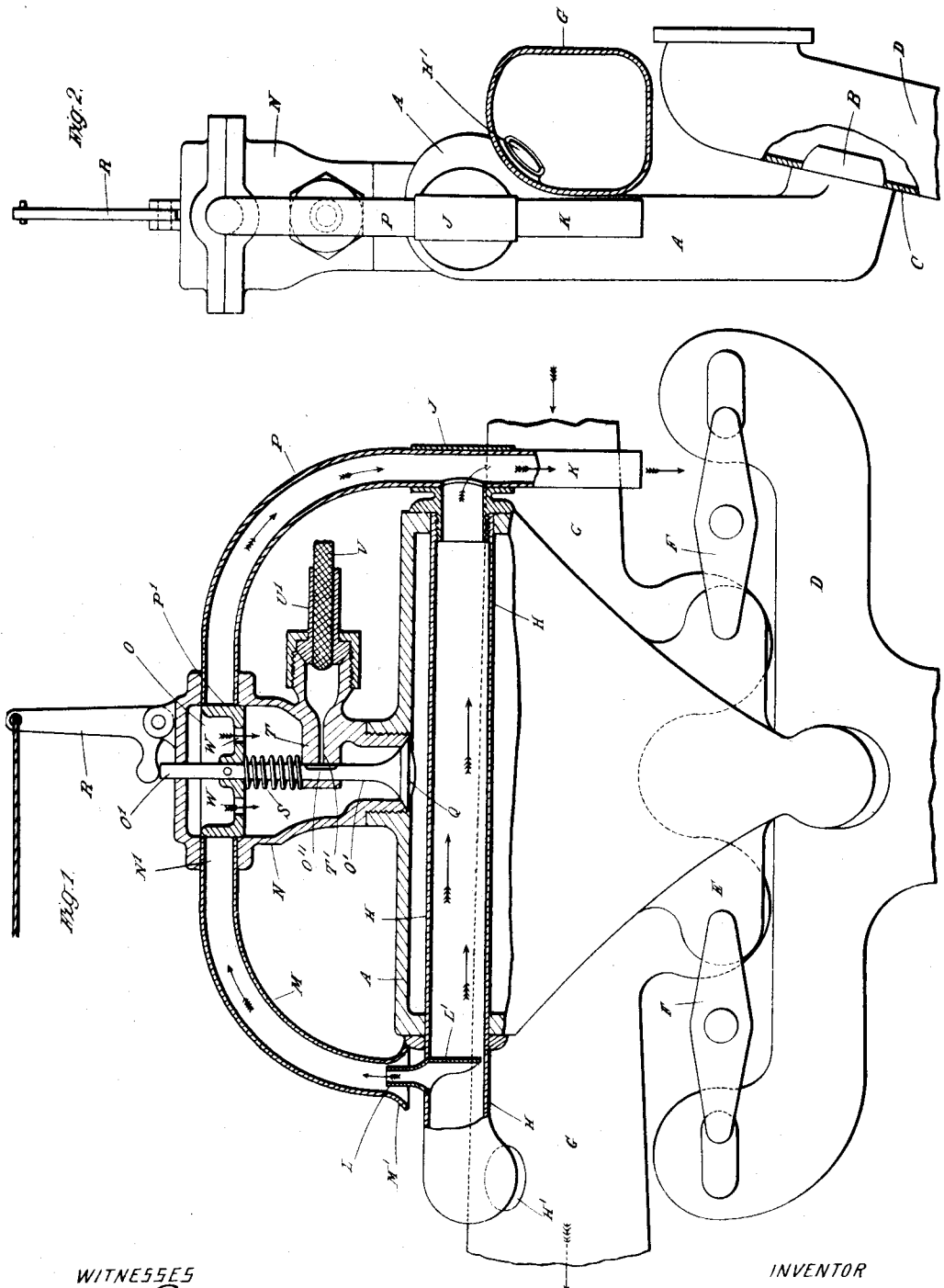
WITNESSES
INVENTOR
WALTER H. HAYES
BY
ATTORNEYS

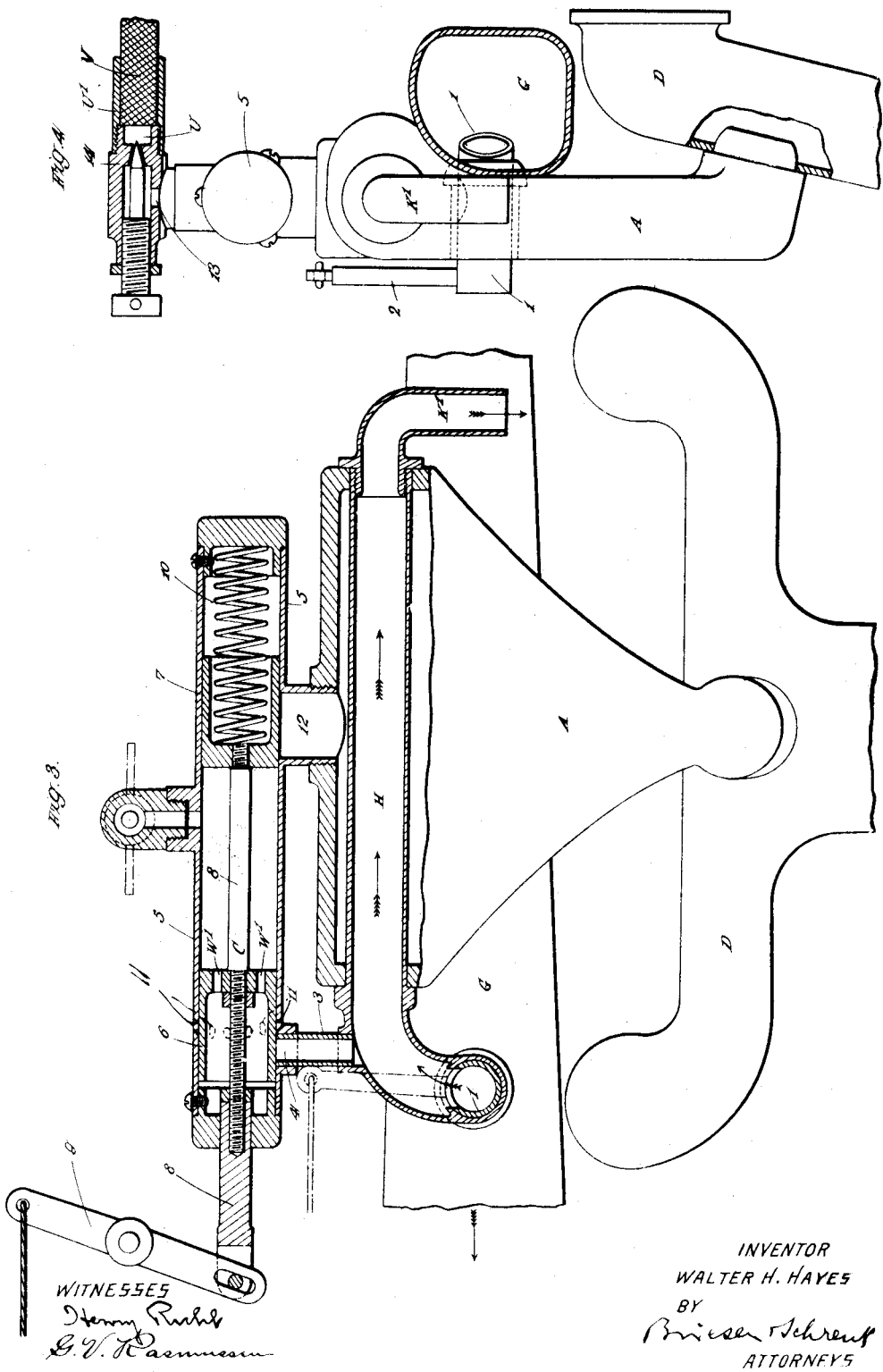

UNITED STATES PATENT OFFICE.

WALTER HENRY HAYES, OF LONDON, ENGLAND.

INTERNAL-COMBUSTION ENGINE.

1,345,927.  Specification of Letters Patent.  Patented July 6, 1920.

Application filed January 27, 1919. Serial No. 273,271.

*To all whom it may concern:*

Be it known that I, WALTER HENRY HAYES, a subject of the King of Great Britain, residing at London, England, have invented new and useful Improvements in Internal-Combustion Engines, of which the following is a specification.

This invention relates to the vaporizers of internal-combustion engines of the kind in which the vapor of paraffin or like oil of medium density constitutes, in conjunction with exhaust gases from the engine and with atmospheric air, the fuel-ingredient of the explosive mixture, the heat of the exhaust gases from the engine being employed to effect the vaporization of the oil.

It has already been suggested to employ a vaporizer wherein a heating pipe in communication with the exhaust of the engine extends transversely through a chamber into the bottom of which a mixture of air and fuel is admitted, through an aperture controlled by a valve, the mixture, after passing the transverse heating pipe, being mixed with a further supply of air just before it reaches the outlet of the vaporizer, which is arranged at the top.

According to my invention, exhaust gases from the engine are mixed with air and liquid fuel and the mixture passed into a heated chamber containing a transverse pipe in communication with the exhaust of the engine, from which chamber the heated mixture is drawn off into the induction pipe of the engine. The air for admixture with the oil-vapor is supplied to the chamber containing the transverse heating pipe through an inlet-conduit into which the liquid fuel is admitted, and which is also in communication with the exhaust from the engine, so that the exhaust gases entering such conduit with the air serve to draw-in and to heat the air before coming into contact with the fuel and thereby also heating the latter, whereby the air and fuel are heated on their way to the mixing or vaporizing chamber.

The said vaporizing chamber is advantageously made of substantially triangular form with the inlet in the middle of one side, which is preferably arranged horizontally at the top and along which extends the heating pipe at a short distance below the inlet, the outlet being arranged at the bottom angle opposite to such inlet.

My invention also comprises improved valve mechanism whereby the supply of air and exhaust gases to the mixing chamber is controlled.

In the accompanying drawings, which illustrate two examples of apparatus embodying the invention, Figure 1 is a vertical section and Fig. 2 an end elevation, partly in section, showing one form of the improved vaporizer. Figs. 3 and 4 are respectively similar views to Figs. 1 and 2, showing a modification.

Like letters and figures of reference indicate corresponding parts in the several views.

Referring to Figs. 1 and 2 A is the mixing or vaporizing chamber which is made substantially in the form of an inverted equilateral triangle and is provided at its lower angle with an outlet branch B, around which there is arranged a spherical union surface adapted to engage a corresponding shaped seat C formed around an aperture in the induction-pipe D of the engine. The chamber A has lugs E, E adapted to engage at the front with turn-buttons F, F, and at the rear with the exhaust pipe G of the engine. Along the upper side of the chamber A extends a pipe H, the inlet end of which is provided with a spherical union surface H¹ adapted to engage a correspondingly shaped seat formed around an aperture in the exhaust pipe G. The other or outlet end of the pipe H opens into a T piece J, to the lower end of the transverse member of which is connected a pipe K the lower end of which opens into the atmosphere. Near the inlet end of the heating pipe H there is an outlet nozzle L arranged in combination with an internal baffle L¹, whereby hot gases from the pipe H are deflected into the nozzle L. The jet of exhaust gases issuing from this nozzle passes into the flared inlet end M¹ of a pipe M, the other end of which is in communication with a port N¹ in a valve casing N in the upper cylindrical part of which there slides a piston valve O. Opposite the port N¹ which constitutes a mixing chamber in the casing N there is an aperture P¹ which communicates through a pipe P with the upper end of the transverse member of the T-piece J. The spindle O¹ of the piston valve O carries at its lower end a mushroom valve Q for controlling communication between the lower end of the casing N and the interior of the mixing chamber A, the conduit controlled by this valve opening into the chamber A in the middle of the side opposite the outlet B. The valve spindle $O^1$ extends out through the top of the casing N and is adapted to be lifted or depressed by a bell-crank lever R in opposition to the pressure of a spring S which normally holds the valves O, Q in their closed positions. This lever may be operated automatically or by hand as desired.

The valve-spindle $O^1$ makes a sliding fit in a passage in a bracket T within the casing N, and into this passage there opens a port $T^1$ communicating with a chamber U to which paraffin or like oil is supplied through a pipe $U^1$ provided with an internal wick V and extending into an oil reservoir, not shown. The valve-spindle $O^1$ is formed, at that part in its length which lies within the bracket T when the valves O, Q are closed, with a flat or groove $O^{11}$, which, when the spindle $O^1$ is depressed by means of the lever R, opens communication between the oil chamber U and the interior of the mixing chamber A, so that the oil runs down on to the conical upper surface of the valve Q and is vaporized by the mixture of air and hot gases drawn into the mixing chamber through the ports W in the valve O and through the chamber N, the downward flow of such mixture being promoted by the suction of the engine piston or pistons acting through the induction-pipe D, and the interior of the mixing chamber A.

In the modified form of construction shown in Figs. 3 and 4, the heating pipe H opens to the exterior through a pipe $K^1$ and its inlet is controlled by a cock 1 which is preferably operated by means of a lever 2 acting in opposition to a suitable spring. The hot exhaust gases for heating the air and fuel supplies pass from a bend in the tube H, near the inlet end thereof, through a tube 3 to a port 4 in a cylindrical valve-casing 5, which also constitutes a mixing chamber and in which casing slide two interconnected piston-valves 6, 7 operated by a spindle 8 and lever 9 acting against a spring 10. The valve 6 controls the port 4 and one or more air inlet ports 11, 11, and is provided with holes $W^1$, while the valve 7 controls a port 12 affording communication between the valve casing 5 and the interior of the mixing chamber A. In this case, the admission of the fuel from the supply chamber U to the valve casing 5 is controlled by a hand-operated needle valve 14, from which the oil passes through a passage 13 into said casing.

The valves 6, 7 are preferably so arranged on the spindle 8 that the port 12 is opened first, then the port 4, and finally the air-port or ports 11.

By the constructions above described, wherein the air for vaporization is mixed with the hot exhaust gases at the entrance to the chambers in which the oil valve is located before it comes into contact with the liquid fuel, and wherein the vaporous and gaseous mixture, as it enters the vaporizing and expansion chamber A, impinges directly on the heating tube H, it is possible to obtain very efficient and certain operation of the engine when running with paraffin or like liquid fuel, after the exhaust pipe and mixing chamber have been heated up by running the engine for a sufficient time with petrol or like light hydrocarbon.

Having now particularly described and ascertained the nature of my said invention and in what manner the same is to be performed, I declare that what I claim is:—

1. A vaporizer for internal combustion engines working with paraffin or like liquid fuel, comprising the combination of means for mixing exhaust gases from the engine with the air and fuel, a vaporizing chamber, a pipe passing transversely through said vaporizing chamber and conveying exhaust gases from the engine whereby said vaporizing chamber is heated, a valve for controlling the admission of said mixture of exhaust gases, air and fuel to said vaporizing chamber, an induction pipe of the engine, and means for connecting said vaporizing chamber with said induction pipe so as to conduct the vaporized mixture thereto.

2. A vaporizer for internal combustion engines working with paraffin or like liquid fuel, comprising the combination of means for mixing exhaust gases from the engine with the air and fuel, a vaporizing chamber, a pipe conveying exhaust gases from the engine and passing transversely through the top of said chamber whereby the latter is heated, a valve for controlling the admission of said mixture of exhaust gases, air and fuel to the top of said vaporizing chamber, an induction pipe of the engine, an outlet leading from the bottom of said vaporizing chamber to said induction pipe.

3. A vaporizer for internal combustion engines working with paraffin or like liquid fuel, comprising the combination of a mixing chamber for the exhaust gases, air and liquid fuel, a fuel inlet to said mixing chamber, an air inlet to said mixing chamber, a nozzle conveying exhaust gases and associated with said air inlet in the manner of an injector whereby the gases entering said air inlet serves to draw in and heat the air passing into said mixing chamber before coming into contact with the liquid fuel, and also whereby the said air and fuel are heated in said mixing chamber before entering the vaporizing chamber, a vaporizing chamber connected with said mixing chamber, a pipe passing transversely through said vaporizing chamber and conveying exhaust gases from the engine whereby said vaporizing chamber is heated, a valve for controlling the admission of said mixture of exhaust gases, air and fuel from said mixing chamber to said vaporizing chamber, an induction pipe of the engine, and means for connecting said vaporizing chamber with said induction pipe so as to conduct the vaporized mixture thereto.

4. A vaporizer for internal combustion engines working with paraffin or like liquid fuel, comprising the combination of a mixing chamber for the exhaust gases, air and liquid fuel, a fuel inlet to said mixing chamber, an air inlet to said mixing chamber, a nozzle conveying exhaust gases and associated with said air inlet in the manner of an injector whereby the gases entering said air inlet serve to draw in and heat the air passing into said mixing chamber before coming into contact with the liquid fuel, and also whereby the said air and fuel are heated before entering the vaporizing chamber, a vaporizing chamber connected with said mixing chamber, a pipe passing transversely through said vaporizing chamber and conveying exhaust gases from the engine whereby said vaporizing chamber is heated, a valve for controlling the admission of said mixture of exhaust gases, air and fuel from said mixing chamber to said vaporizing chamber, an induction pipe of the engine, and means for connecting said vaporizing chamber with said induction pipe so as to conduct the vaporized mixture thereto.

5. A vaporizer for internal combustion engines working with paraffin or like liquid fuel, comprising the combination of means for mixing exhaust gases from the engine with the air and fuel, a vaporizing chamber of substantially triangular form in elevation and with the inlet for the mixture in the middle of one side, a heating pipe extending along said side at a short distance from the inlet, the outlet being arranged at the angle opposite such inlet, a valve for controlling the admission of said mixture of exhaust gases, air and fuel to said vaporizing chamber, an induction pipe of the engine, and means for connecting said vaporizing chamber with said induction pipe so as to conduct the vaporized mixture thereto.

6. A vaporizer for internal combustion engines working with paraffin or like liquid fuel, comprising the combination of means for mixing exhaust gases from the engine with the air and fuel, a vaporizing chamber of substantially triangular form in elevation with the apex downward and with the inlet for the mixture in the middle of the upper side, a heating pipe extending along said upper side at a short distance from the inlet, a valve for controlling the admission of said mixture of exhaust gases, air and fuel to the top of said vaporizing chamber, an induction pipe of the engine, and an outlet leading from the bottom of said vaporizing chamber to said induction pipe.

7. A vaporizer for internal combustion engines working with paraffin or like liquid fuel, comprising the combination of a vaporizing chamber, a pipe passing transversely therethrough and conveying exhaust gases from the engine whereby said chamber is heated, a mixing chamber for the exhaust gases, air and liquid fuel, a fuel inlet to said mixing chamber, an air inlet to said mixing chamber, a nozzle conveying exhaust gases and associated with said air inlet in the manner of an injector whereby the gases entering said air inlet serve to draw in and heat the air passing into said mixing chamber before coming into contact with the liquid fuel, and also whereby the said air and fuel are heated before entering the vaporizing chamber, a valve controlling the inlet of the exhaust gases and air to said mixing chamber, a valve for controlling the admission of said mixture of exhaust gases, air and fuel into the top of said vaporizing chamber, an induction pipe of the engine, an outlet leading from the bottom of said vaporizing chamber to said induction pipe, means whereby the said valve controlling the inlet of exhaust gases and air to said mixing chamber is operatively connected to the valve for controlling the introduction of the mixture of air, exhaust gases and fuel to the vaporizing chamber.

8. A vaporizer for internal combustion engines working with paraffin or like liquid fuel, comprising the combination of a mixing chamber for the exhaust gases, air and liquid fuel, a vaporizing chamber, a pipe passing transversely therethrough and conveying exhaust gases from the engine whereby said chamber is heated, a valve for controlling the admission of the said mixture of exhaust gases, air and fuel to said vaporizing chamber, an induction pipe of the engine, means for connecting said vaporizing chamber with said induction pipe so as to conduct the vaporized mixture thereto, a fuel inlet to said mixing chamber, a valve for controlling the inlet of fuel to said mixing chamber, an air inlet to said mixing chamber, a nozzle conveying exhaust gases and associated with said air inlet in the manner of an injector whereby the gases entering the said air inlet serve to draw in and heat the air passing into said mixing chamber before coming into contact with the liquid fuel, and also whereby the said air and fuel are heated before entering the vaporizing chamber, a valve controlling the inlet of the exhaust gases and air to said mixing chamber, means whereby the said valve controlling the inlet of exhaust gases and air to said mixing chamber is operatively connected to the valve for controlling the introduction of the mixture of air and exhaust gases to the vaporizing chamber.

9. A vaporizer for internal combustion engines working with paraffin or like liquid fuel, comprising the combination of a vaporizing chamber, a pipe passing transversely therethrough and conveying exhaust gases from the engine whereby said chamber is heated, an induction pipe of the engine, means for connecting said vaporizing chamber to said induction pipe, a mixing chamber for the exhaust gases, air and liquid fuel, an air inlet to said mixing chamber, a fuel inlet to said mixing chamber, a valve controlling the said fuel inlet, a valve controlling the inlet of exhaust gases to said mixing chamber from the heating pipe of the vaporizing chamber, a valve controlling the passage of the mixture of air, gases and fuel to said vaporizing chamber and means whereby the valve controlling the passage of the mixture of air, fuel and exhaust gases into the vaporizing chamber is caused to open before the valve controlling the admission of exhaust gases to the inlet conduit of the mixing chamber and whereby the last mentioned valve opens before the valve controlling the admission of air to said mixing chamber.

10. A vaporizer for internal combustion engines working with paraffin or like liquid fuel, comprising the combination of a mixing chamber for the exhaust gases, air and liquid fuel, a fuel inlet to said mixing chamber, an air inlet to said mixing chamber, a nozzle conveying exhaust gases and associated with said air inlet in the manner of an injector whereby the gases entering said air inlet serve to draw in and heat the air passing into said mixing chamber before coming into contact with the liquid fuel, and also whereby the said air and fuel are heated before entering the vaporizing chamber, a vaporizing chamber, a pipe passing transversely therethrough and conveying exhaust gases from the engine whereby said chamber is heated, a valve for controlling the admission of said mixture of exhaust gases, air and fuel to the top of said vaporizing chamber, an induction pipe of the engine, means for connecting the bottom of said vaporizing chamber with said induction pipe so as to conduct the vaporized mixture thereto, a wick feed device connected from the fuel supply to the fuel inlet of the mixing chamber.

WALTER HENRY HAYES.